US008704817B2

(12) United States Patent
Hu

(10) Patent No.: US 8,704,817 B2
(45) Date of Patent: Apr. 22, 2014

(54) DRIVING CONTROL APPARATUS AND METHOD FOR USE WITH A DISPLAY ARRAY

(75) Inventor: Shuo-Hsiu Hu, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 1059 days.

(21) Appl. No.: 11/683,169

(22) Filed: Mar. 7, 2007

(65) Prior Publication Data

US 2008/0068357 A1 Mar. 20, 2008

(30) Foreign Application Priority Data

Sep. 14, 2006 (TW) ................................ 95134028 A

(51) Int. Cl.
*G06F 3/038* (2013.01)
*G09G 5/00* (2006.01)
*G09G 3/30* (2006.01)
*G09G 3/10* (2006.01)

(52) U.S. Cl.
USPC ............. 345/212; 345/204; 345/211; 345/76; 345/77; 315/169.3

(58) Field of Classification Search
USPC ..................... 345/76–83, 204–215, 690–699; 315/169.3
See application file for complete search history.

(56) References Cited

U.S. PATENT DOCUMENTS

2004/0056604 A1* 3/2004 Shih et al. .................. 315/169.2
2004/0090400 A1* 5/2004 Yoo ................................ 345/76
2006/0244691 A1* 11/2006 Lee ................................ 345/76

FOREIGN PATENT DOCUMENTS

TW 588468 5/2004

OTHER PUBLICATIONS

Taiwan Office Action mailed May 18, 2011.
English translation of Taiwan Office Action mailed May 18, 2011.

* cited by examiner

*Primary Examiner* — Kenneth Bukowski
(74) *Attorney, Agent, or Firm* — McClure, Qualey & Rodack, LLP

(57) ABSTRACT

A driving control apparatus and method for use with a display array are provided. The display array comprises a plurality of pixel areas arranged in an array configuration. The driving control apparatus comprises a system control circuit and a drive circuit. The system control circuit is adapted to detect an activation signal and determine an enabling period after the detection. The drive circuit is adapted to control the activation of the display array. The drive circuit comprises a plurality of scan lines and data lines. During the enabling period, each of the scan lines activates part of the pixel areas while each of the data lines transmit a voltage to the activated pixel area so that at least a part of the activated pixels corresponds to a predetermined luminance. The driving control method comprises steps for implementing the driving control apparatus.

12 Claims, 5 Drawing Sheets

DRIVING CONTROL APPARATUS AND METHOD FOR USE WITH A DISPLAY ARRAY

This application claims priority to Taiwan Patent Application No. 095134028 filed on Sep. 14, 2006, the disclosures of which are incorporated herein by reference in their entirety.

BACKGROUND OF THE INVENTION

1. Field of the Invention

The present invention relates to a driving control apparatus and a method for use with a display array; specifically, the invention relates to a driving control apparatus and a method of avoiding the generation of a transient luminance frame.

2. Descriptions of the Related Art

Due to the beneficial characteristics of organic light emitting displays (OLEDs), such as self-luminance, high luminance, high contrast, and wide viewing angles, increasingly more studies have focused on this field. OLEDs can be categorized into active matrix organic light emitting displays (AMOLEDs) and passive matrix organic light emitting displays (PMOLEDs).

FIG. 1 depicts a pixel area 1 of an AMOLED, comprising a first transistor 11, a second transistor 12, an organic light emitting element 13, and a storage capacitor 14. The first transistor 11 is connected to a scan line 111 and a data line 112. The scan line 111 is used to turn on the first transistor 11 such that a voltage level of the data line 112 can be transmitted to the second transistor 12 as the first transistor 11 is turned on. The second transistor 12 generates different current levels to drive the organic light emitting element 13 according to different voltage levels, $V_{GS}$, wherein the different current levels lead to different grayscale values of the organic light emitting element 13. The second transistor 12 is mostly a P-type transistor. With the P-type transistor, a lower gate voltage level generates a higher current level. On the contrary, a higher gate voltage level generates a lower current level.

The light emitting power of the OLED is provided by an external power system. All the $V_{dd}$ terminals of the pixel area 1 are parallel and connected to the external power system. Similarly, all the $V_{ss}$ terminals of the pixel area 1 are parallel and connected to the external power system. To reduce power consumption, both $V_{dd}$ and $V_{ss}$ are shutdown while the organic light emitting display is on standby mode. While the OLED is restarting, the external power retransmits to provide both the $V_{dd}$ and $V_{ss}$. Such a design, however, faces significant problems. Specifically, the OLED generates a transient bright frame during the restart by retransmitting the external power of $V_{dd}$ and $V_{ss}$. This causes human's vision discomfort. Consequently, it is important to create a more stable display for an OLED apparatus that also prevents the generation of a transient bright frame during restart.

SUMMARY OF THE INVENTION

One objective of the present invention is to prevent the generation of a transient bright frame during the restart of the apparatus. To achieve this objective, this invention provides a driving control apparatus for use with a display array. The display array has a plurality of pixel areas arranged in an array configuration. The driving control apparatus comprises a system control circuit and a driving circuit. The system control circuit detects an activation state and determines an enabling period after the detection. The driving circuit, electrically connected to the plurality of pixel areas, controls an activation of the display array, wherein the driving circuit has a plurality of scan lines and data lines. Each of the scan lines controls the activation of some pixel area during the enabling period. Each of the data lines sends a voltage to the activated pixel area during the enabling period so that a luminance of the activated pixel areas corresponds to a predetermined luminance.

Another objective of the present invention is to provide a driving control method to execute said apparatus, comprising the following steps: detecting an activation state of the display array; determining an enabling period of the display array; activating part of the plurality of the pixel areas during the enabling period; and sending a voltage to the activated pixel areas during the enabling period so that a luminance of the activated pixel areas corresponds to a predetermined luminance.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

To better understand the present invention, the following is a brief description about the causes behind the generation of a transient bright frame during the restart of the apparatus.

The display array comprises a plurality of scan lines to control a plurality of pixel areas arranged in an array configuration. That is, each of the scan lines controls one row of pixel areas. Only one of the scan lines is activated at any time (imagine a sliced short period of time) for the display array. In other words, only one of the scan lines can activate a first transistor of a corresponding controlled row of the pixel areas such that a corresponding data line can transmit a voltage to the gate electrode of the second transistor. The remaining scan lines stay inactivated, i.e., the corresponding gate electrodes are in a floating state. While the display apparatus restarts from a standby, an external power $V_{dd}$ and $V_{ss}$ will be inputted again. When connecting with the external power $V_{ss}$, the voltage level of the gate electrode of the second transistor will be affected by a storage capacitance $C_{st}$. Since $V_{ss}$ is a negative power, the gate electrode of the second transistor will drop as a negative power. Here, it is assumed that the second transistor is a P-type transistor as most modern products. For the second transistor, $V_{GS}$ immediately becomes very low because the $I_d$ that passed through the second transistor becomes large. This interaction causes the transient bright frame. Consequently, a principle of this invention is to reduce the voltage of the gate electrode of the second transistor influenced by external negative power.

Figure 1:
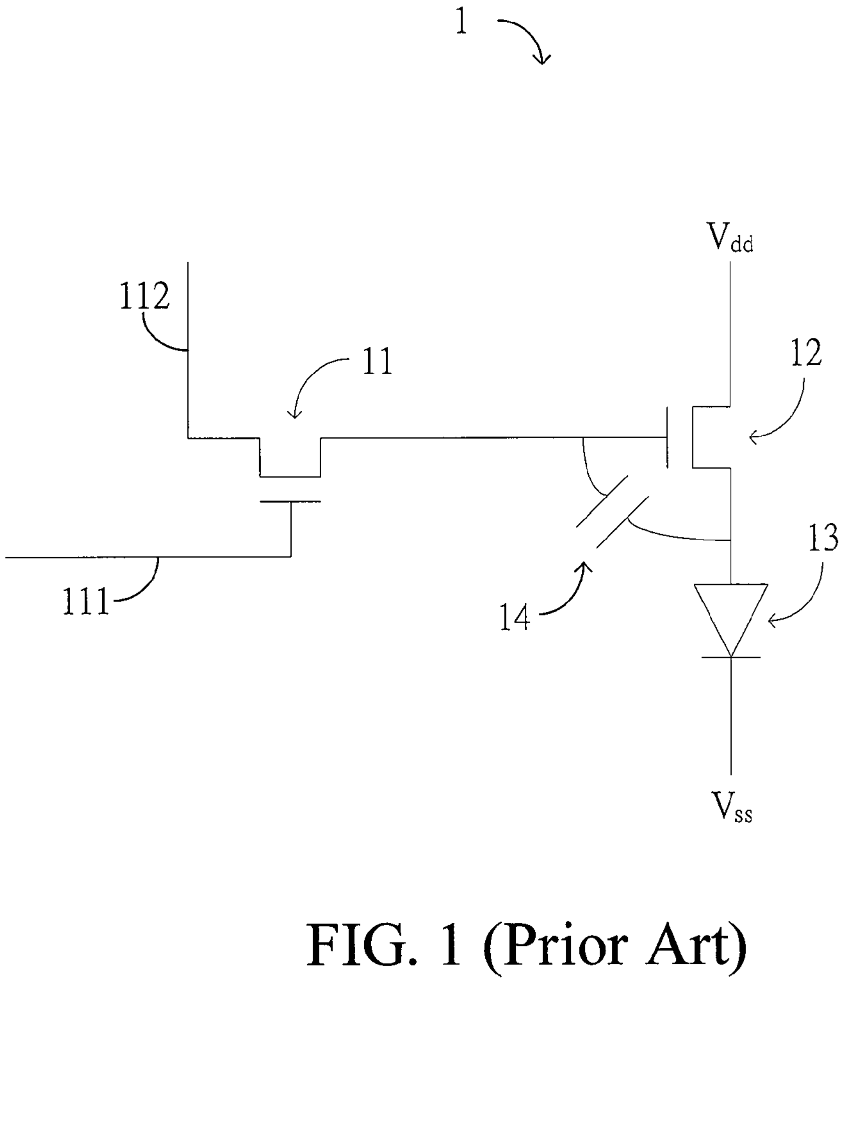
FIG. 1 (Prior Art)
FIG. 1 is a schematic diagram of an electrode connection structure of a pixel area of an AMOLED.
Figure 2:
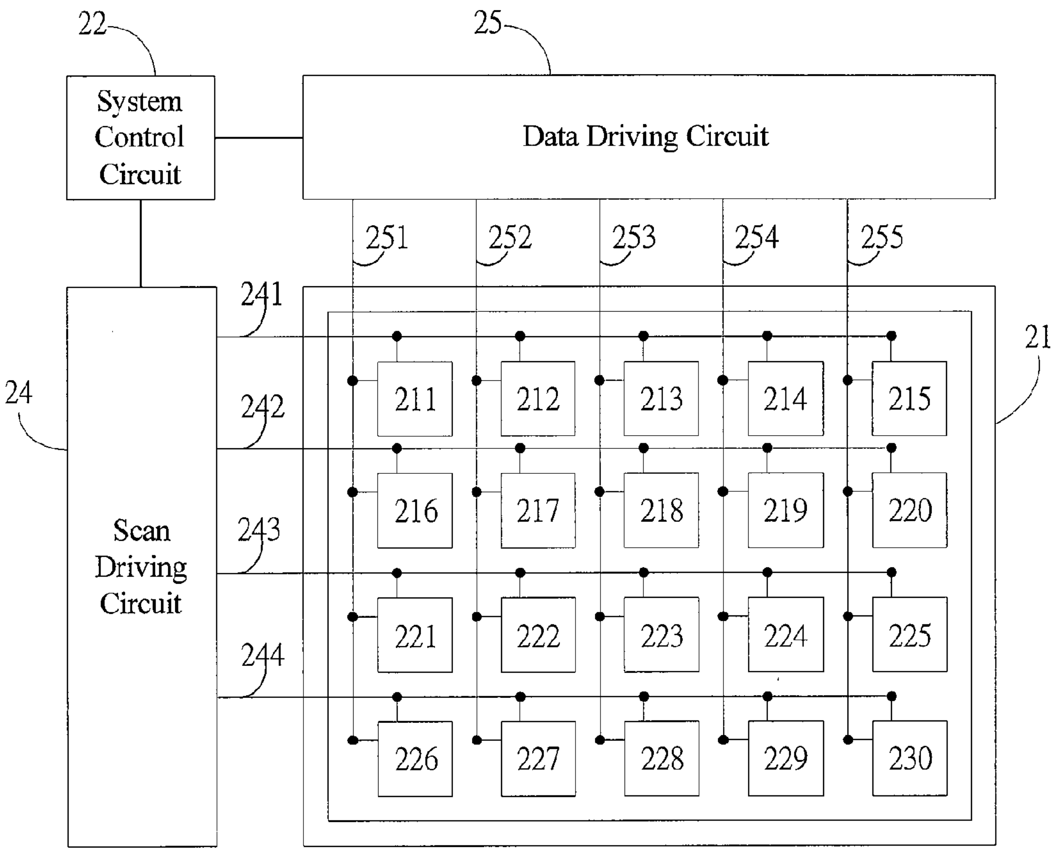
FIG. 2 is a diagram of a driving control apparatus of this invention.

FIG. 2 shows a display array 21 of a driving control apparatus of this invention. First, a detailed structure of each part is described. Then, a function of each part is described. The display array 21 comprises twenty pixel areas 211~230 in an array configuration. The driving control apparatus comprises a system control circuit 22, a scan driving circuit 24, and a data driving circuit 25. The scan driving circuit 24 and the data driving circuit 25 are electrically connected to the plurality of pixel areas 211~230 for controlling an activation of the display array 21. The scan driving circuit 24 comprises a plurality of scan lines 241, 242, 243, and 244. The data driving circuit 25 comprises a plurality of data lines 251, 252, 253, 254, and 255.

Figure 3:
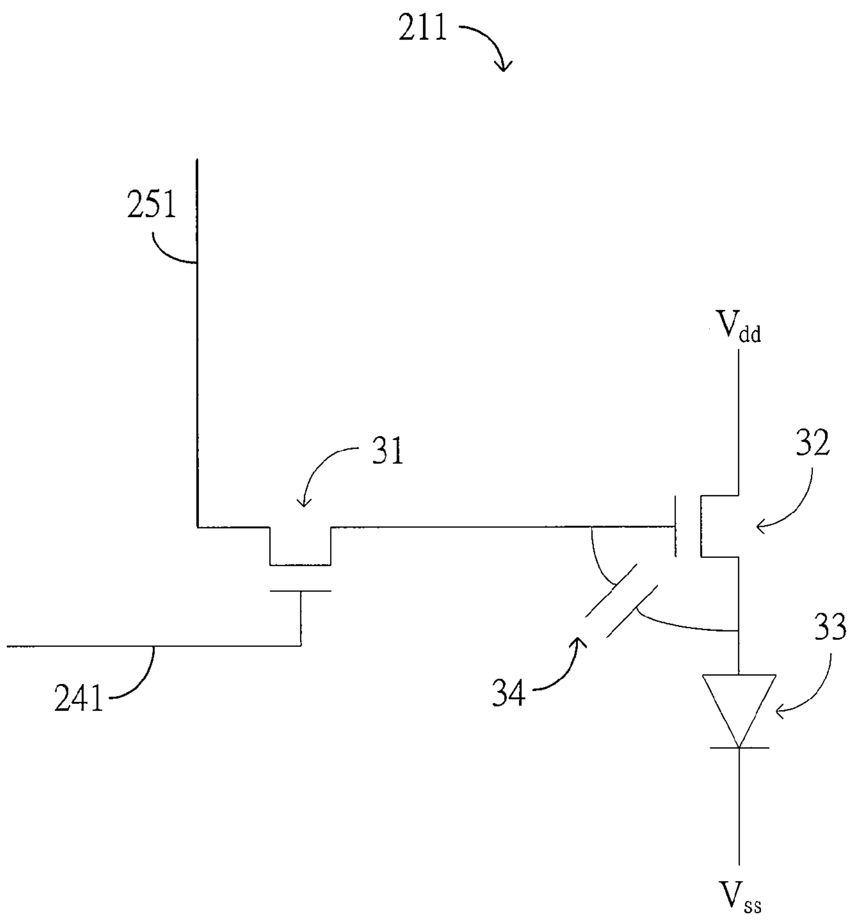
FIG. 3 is a schematic diagram of an electrode connection structure of a pixel area of this invention.

FIG. 3 depicts a physical structure of the pixel area 211, which comprises a first transistor 31, a second transistor 32, a light emitting element 33, and a storage capacitor 34. In this embodiment, the first transistor 31 is an N-type transistor, and the second transistor 32 is a P-type transistor. The first transistor 31 has a control terminal, a first terminal, and a second terminal, which corresponds to its gate electrode, drain electrode and source electrode, respectively. The control terminal of the first transistor 31 is connected to the scan line 241 of the scan driving circuit 24, and the first terminal of the first transistor 31 is connected to the data line 251 of the data driving circuit 25, wherein the scan line 241 determines an activation of the first transistor 31. The data line 251 adjusts a luminance of the pixel area 211 when the first transistor 31 is activated. The second transistor 32 has a control terminal, a first terminal, and a second terminal, which corresponds to its gate electrode, drain electrode and source electrode, respectively. The control terminal of the second transistor 32 is connected to the second terminal of the first transistor 31, while the first terminal of the second transistor 32 is connected to the first power source $V_{dd}$. The light emitting component 33 has a first terminal and a second terminal. The first terminal of the light emitting component 33 is connected to the second terminal of the second transistor 32, i.e., the drain electrode. The second terminal of the light emitting component 33 is connected to the second power source $V_{ss}$. The storage capacitor 34 comprises a first terminal and a second terminal, wherein the first terminal is connected to the gate electrode of the second transistor 32, while the second terminal is connected to an arbitrary fixed voltage. In this embodiment, the second terminal of the storage capacitor 34 is connected to $V_{ss}$ indirectly. In other embodiments, the second terminal can be selectively connected to $V_{dd}$. Each of the other pixel areas 212~230 also comprises a first transistor, a second capacitor, a light emitting element and a storage capacitor. Each of the other pixel areas 212~230 is connected to both a scan line of the scan driving circuit 24 and a data line of the data driving circuit 25. These connections are similar to the previously mentioned connections and therefore, require no further details.

Figure 4:
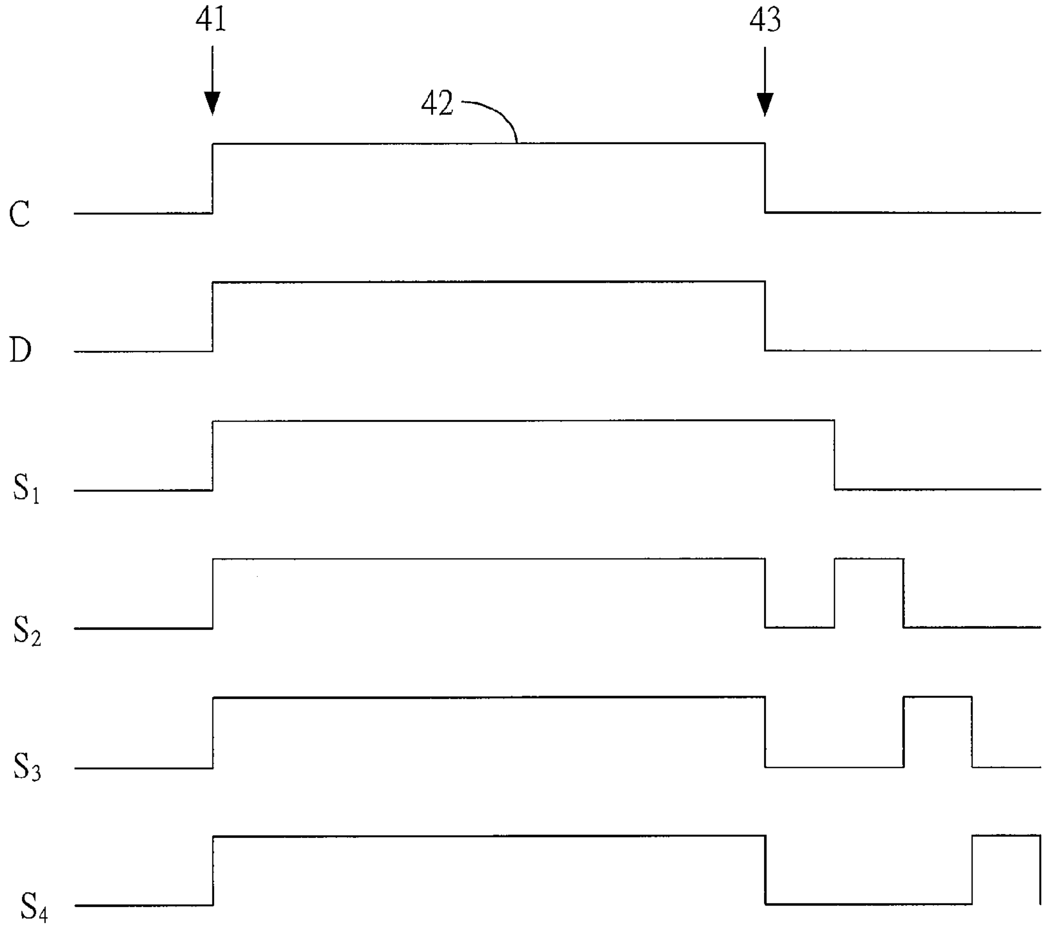
FIG. 4 is a diagram of timing signals for each elements of this invention.

The following is a description about the function of each part and the time of execution. FIG. 4 illustrates the timing signal diagram of each part of this embodiment. In FIG. 4, the signal C represents the timing signal of the system control circuit 22, D represents the timing signal of the data lines 251, 252, 253, 254, and 255. Signals $S_1$ to $S_4$ separately represent the timing signals of the scan lines 241 to 244.

In more detail, the system control circuit 22 will detect the activation state while the display array 21 of this embodiment restarts from standby. Unlike the prior art, this embodiment does not temporarily provide the external power sources, $V_{ss}$ and $V_{dd}$, to the pixel areas. Next, the system control circuit 22 immediately pulls the timing signal from the negative voltage to the positive voltage, as indicated by the arrow 41 in FIG. 4, determining the enabling period 42. The other arrow 43 is the end time of the enabling period 42. During the enabling period 42, the system control circuit 22 has outputs within the high voltage range. The enabling period can be determined according to various characteristics of the different display apparatuses.

While the system control circuit 22 is pulling the timing signal as indicated by the arrow 41, all the signals ($S_1$, $S_2$, $S_3$, and $S_4$) of the scan lines transit from a negative voltage to a positive voltage and maintain the positive voltage during the enabling period. The scan lines $S_1$~$S_4$ control the activation of all the pixel areas of the display array 21 during the enabling period. For example, the scan line $S_1$ controls the activation of the pixel areas 211 to 215. Under this condition, the first transistor of the corresponding pixel areas is in the activated state. Another example is of the scan line 241 with the timing signal shown as $S_1$. The first transistor of the pixel areas 211~215 corresponding to the scan line 241 is activated with the high voltage of $S_1$. Yet another example is of the scan line 242 with the timing signal shown as $S_2$. The first transistor of the pixel areas 216~220 corresponding to the scan line 242 is activated in response to the high voltage of $S_2$.

During the enabling period, the timing signals of the data lines 251, 252, 253, 254, and 255 also transit from the negative voltage to the highest voltage as depicted in a signal D of FIG. 4. Since the first transistor is activated, the level of D can be transmitted to the second transistor. For example, the pixel area 211 in FIG. 3 illustrate that the highest voltage of the signal D makes the gate electrode of the second transistor remain in the high voltage state. Consequently, an electrical charge degree between the two terminals $C_{st}$ being affected is reduced significantly such that the second transistor 32 is unlikely to generate enough current to turn on the light emitting component 33. After the enabling period 42, the display array 21 is able to provide the external power sources $V_{ss}$ and $V_{dd}$. In this embodiment, the lowest luminance for the light emitting component can be formed since the level of D has the highest voltage. During the enabling period 42, the voltage level of D can be set to another non-highest voltage level depending on the requirements of the products if the pixel areas need to display other luminances.

In this embodiment, all the scan lines remain in the high voltage state during the enabling period such that all the first transistors stay in the activation state. The activated D signal during the enabling period 42 corresponds to the activation of the first transistor and is transmitted to all the second transistors. Therefore, the gate electrodes of the second transistor of each pixel areas of the display array 21 remain in the high voltage state instead of the floating state. Consequently, the electrical charge degree between two terminals of $C_{st}$ being affected by the negative voltage of $V_{ss}$ is reduced significantly while $V_{ss}$ is connected suddenly. This interaction prevents the second transistor from generating enough current to provide light for all the light emitting components.

In this embodiment, all scan lines control the activation of its corresponding pixel areas during the enabling period such that all the pixel areas are under control. In addition, all data lines provide the highest voltage level to all the pixel areas during the enabling period such that the corresponding luminance of all the pixel areas is the lowest luminance. Nevertheless, not all pixel areas need to be controlled during the enabling period. For instance, if users want a dark upper half area and a bright lower half area for the display array after restarting from standby, only the upper area of the display array would apply to this invention. Furthermore, said first transistor can either be an N-type transistor or a P-type transistor. However, when the first transistor is substituted by a P-type transistor, the voltage of the scan lines should be negative to keep the first transistor in the activation state. In addition, the second transistor can either be an N-type transistor or a P-type transistor. Nevertheless, when the first transistor is substituted by an N-type transistor, the voltage of the data lines should be negative.

Figure 5:
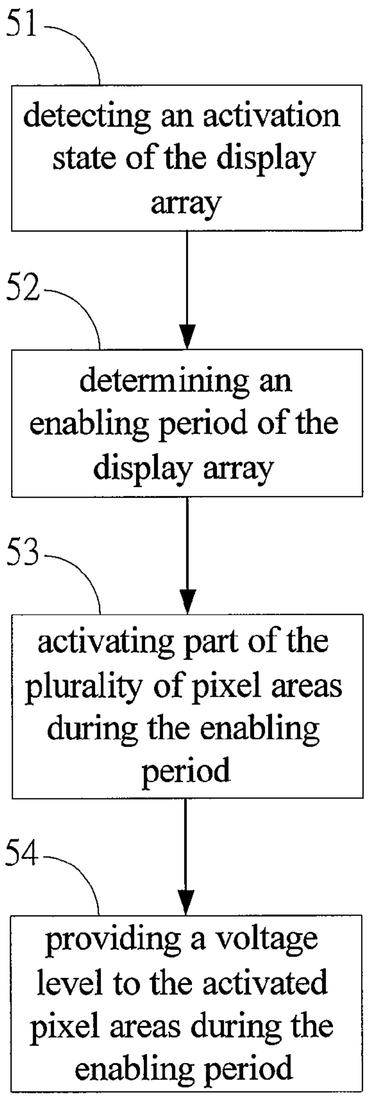
FIG. 5 is a conceptual flow chart of a driving control apparatus of this invention.

FIG. 5 depicts the driving control method of controlling the display array in this invention. This display array has a plurality of pixel areas arranged in an array configuration. First, step 51 is executed to detect the activation state of the display array. Next, step 52 is executed to determine the enabling period of the display array. Next, step 53 is executed to activate part of the plurality of pixel areas during the enabling period. Finally, step 54 is executed to transmit a voltage to the activated pixel areas during the enabling period so that the luminance of the activated pixel areas corresponds to a predetermined luminance.

In addition to the steps shown in FIG. 5, the method may comprise all of the operations or functions recited in the first embodiment. Those skilled in the art can straightforwardly realize how the steps of the method perform based on the above descriptions of the first embodiment. Therefore, the descriptions for these steps are redundant and not repeated herein.

According to the above-mentioned descriptions, this invention utilizes a predetermined driving timing sequence to effectively reduce the transient bright frame generated while the negative power is connected to the display array. In addition to preventing user discomfort, different effects of the screen can be shown with different arrangements.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the appended claims.

What is claimed is:

1. A driving control apparatus for use with a display array, the display array having a plurality of pixel areas arranged in array configuration, the driving control apparatus comprising:

a system control circuit for detecting an activation state while the display array restarts from standby and determining an enabling period after the detection; and a driving circuit, electrically connected to the plurality of pixel areas, for controlling an activation of the display array, the driving circuit having:

a scan driving circuit having a plurality of scan lines, each of the scan lines controlling an activation of part of the pixel areas during the enabling period; and a data driving circuit having a plurality of data lines, each of the data lines providing a voltage level to the activated pixel areas during the enabling period before the display array provides an external power source to the activated pixel areas so that a luminance of the activated pixel areas corresponds to a predetermined luminance to prevent a transient bright frame occurring while the display array restarts from standby wherein at least one of the plurality of pixel areas comprises:

a first transistor having a control terminal, a first terminal, and a second terminal, the control terminal of the first transistor being connected to one of the scan lines, the first terminal of the first transistor being connected to one of the data lines, the connected scan line determining an activation of the first transistor, the connected data line adjusting the luminance of the pixel areas when the first transistor is activated;

a second transistor having a control terminal, a first terminal, and a second terminal, the control terminal of the second transistor being connected to the second terminal of the first transistor, the first terminal of the second transistor being connected to a first power source; and a light emitting component having a first terminal and a second terminal, the first terminal of the light emitting component being connected to the second terminal of the second transistor, the second terminal of the light emitting component being connected to a second power source.

2. The driving control apparatus according to claim 1, wherein the predetermined luminance is a lowest luminance of the part of the pixel areas.

3. The driving control apparatus according to claim 1, wherein the second transistor is a p-type transistor.

4. The driving control apparatus according to claim 1, wherein the second transistor is an n-type transistor.

5. The driving control apparatus according to claim 1, wherein the first transistor is a p-type transistor.

6. The driving control apparatus according to claim 1, wherein the first transistor is an n-type transistor.

7. The driving control apparatus according to claim 1, wherein the enabling period is about 0.5 seconds.

8. A method used in a driving control apparatus for controlling a display array, the display array having a plurality of pixel areas arranged in array configuration, the driving control apparatus comprising a system control circuit, a drive circuit having a scan driving circuit and a data driving circuit, the scan driving circuit having a plurality of scan lines, the data driving circuit having a plurality of data line, at least one of the plurality of pixel areas comprising a first transistor, a second transistor and a light emitting component, the first transistor having a control terminal connected to one of the scan lines, a first terminal connected to one of the data lines, and a second terminal, the connected scan line determining an activation of the first transistor, the connected data line adjusting the luminance of the pixel areas when the first transistor is activated, the second transistor having a control terminal connected to the second terminal of the first transistor, a first terminal connected to a first power source, and a second terminal, the light emitting component having a first terminal connected to the second terminal of the second transistor and a second terminal connected to a second power source, the method comprising:

detecting an activation state of the display array by the system control circuit while the display array restarts from standby;

determining an enabling period of the display array by the system control circuit;

activating part of the plurality of pixel areas by part of the scan lines during the enabling period; and providing a voltage level to the activated pixel areas by part of the data lines during the enabling period before the display array provides an external power source to the activated pixel areas so that a luminance of the activated pixel areas corresponds to a predetermined luminance to prevent a transient bright frame occurring while the display array restarts from standby.

9. The method according to claim 8, wherein the enabling period is about 0.5 seconds.

10. A driving control apparatus for use with a display array, the display array having a plurality of pixel areas arranged in array configuration, each of the pixel areas comprising a first transistor and a second transistor, the driving control apparatus comprising:

a system control circuit for detecting an activation state while the display array restarts from standby, immediately pulling a timing signal from a first voltage to a second voltage and determining an enabling period of the timing signal after the detection; and a driving circuit, electrically connected to the plurality of pixel areas, for controlling an activation of each of the plurality of pixel areas, the driving circuit having:

a plurality of scan lines, each of the scan lines being connected to a gate electrode of the first transistor and being configured to transit synchronously with the timing signal from the first voltage to the second voltage to activate the first transistor and maintain the second voltage during the enabling period; and a plurality of data lines, each of the data lines being connected to a first terminal of the first transistor and coupled to a gate electrode of the second transistor via a second terminal of the first transistor and being configured to transit synchronously with the timing signal from the first voltage to the second voltage to provide the second voltage to the second transistor and maintain the second voltage during the enabling period before the display array provides an external power source to the activated pixel areas so that a luminance of each of the activated pixel areas corresponds to a predetermined luminance to prevent a transient bright frame occurring while the display array restarts from standby.

11. A method used in a driving control apparatus for controlling a display array having a plurality of pixel areas, the driving control apparatus comprising a drive circuit having a plurality of scan lines and a plurality of data lines intersect to define the pixel areas arranged in array configuration, the method comprising:

detecting an activation state of the display array; determining an enabling period of the display array;

activating all of the scan lines during the enabling period to activate the all pixel areas; and simultaneously providing a voltage level to all of the activated pixel areas by the data lines during the enabling period before the display array provides an external power source to the activated pixel areas so that a luminance of the activated pixel areas corresponds to a predetermined luminance to prevent a transient bright frame occurring while the display array restarts from standby.

12. A method used in a driving control apparatus for controlling a display array having a plurality of pixel areas, the driving control apparatus comprising a drive circuit having a plurality of scan lines and a plurality of data lines intersect to define the pixel areas arranged in array configuration, the method comprising:

detecting an activation state of the display array; determining an enabling period of the display array; activating the scan lines during the enabling period;

providing a voltage level to the pixel areas by the data lines during the enabling period before the display array provides an external power source to the pixel areas so that a luminance of the pixel areas corresponds to a predetermined luminance to prevent a transient bright frame occurring while the display array restarts from standby; and wherein an activating period of a first scan line of the scan lines is longer than the enabling period.

* * * * *